United States Patent [19]

Muratomi

[11] Patent Number: 4,997,241
[45] Date of Patent: Mar. 5, 1991

[54] MULTI-LAYERED ANTIREFLECTION FILM PREVENTING REFLECTION AT TWO WAVELENGTH REGIONS

[75] Inventor: Keiji Muratomi, Warabi, Japan

[73] Assignee: Kabushiki Kaisha TOPCON, Japan

[21] Appl. No.: 431,186

[22] Filed: Nov. 3, 1989

[30] Foreign Application Priority Data

Nov. 8, 1988 [JP] Japan .................................. 63-282114

[51] Int. Cl.$^5$ .............................................. G02B 5/28
[52] U.S. Cl. ...................................... 350/1.6; 350/164; 350/166
[58] Field of Search .................... 350/1.6, 164, 166

[56] References Cited

U.S. PATENT DOCUMENTS

| | | | |
|---|---|---|---|
| 3,990,784 | 11/1976 | Gelber | 350/166 |
| 4,082,413 | 4/1978 | Austin et al. | 350/166 |
| 4,145,113 | 3/1979 | Ranninger et al. | 350/166 |
| 4,856,019 | 8/1989 | Miyata et al. | 350/164 |
| 4,907,846 | 3/1990 | Tustison et al. | 350/164 |
| 4,927,239 | 5/1990 | Melzig et al. | 350/164 |

Primary Examiner—Bruce Y. Arnold
Assistant Examiner—Martin Lerner
Attorney, Agent, or Firm—Mason, Fenwick & Lawrence

[57] ABSTRACT

A multi-layered antireflection film preventing reflection at two wavelength regions has a substrate of a refractive index $n_{sub}$ and a 5-layered structured formed on the substrate and composed of a first layer group including three layers of $n_1(\lambda_1/4)$-$n_2(\lambda_2/2)$-$n_3(\lambda_1/4)$ and a second layer group including two layers of $n_4(\lambda_1/4)$-$n_5(\lambda_1/4)$. The factors are determined such that the following conditions are met:

$$1 < n_1 \leq n_{sub},\ n_2 \geq n_{sub}$$

$$1 < n_3 \leq n_{sub}\ \text{and}\ n_{sub}(n_5^2/n_4^2) \approx 1$$

The layers of the first layer group are made of materials selected from dielectric materials exhibiting compression stresses, while the layers of the second group layer are made of materials selected from dielectric materials exhibiting tensile stresses.

3 Claims, 7 Drawing Sheets

FIG. 6 (PRIOR ART) $1.46/1.63(\lambda_1/4)-1.38(\lambda_1/4)/\text{air}$ $\lambda_1=250\text{nm}$ $1.46/1.63(\lambda_1/4) - 1.38(\lambda_1/4)/\text{air}$  $\lambda_1 = 750\text{nm}$

MULTI-LAYERED ANTIREFLECTION FILM PREVENTING REFLECTION AT TWO WAVELENGTH REGIONS

BACKGROUND OF THE INVENTION

The present invention relates to a multi-layered antireflection film capable of preventing reflection at two separated wavelength regions such as ultraviolet regions and visible wavelength region. More particularly, the present invention is concerned with a multi-layered antireflection film capable of preventing reflection at two wavelength regions, wherein stresses occurring in the layers of the multi-layered film negate each other so as to prevent any stress to be generated in the substrate on which a multiplicity of layers are formed.

(Description of the Prior Art)

A multi-layered film support substrate expressed by BK7 $(n=1.52)/n_1=1.70(\lambda_1/4)-n_2=1.38(\lambda_1/4)/$air $(n_0=1)$ is known. In order to effectively prevent reflection from this substrate at the center frequency $\lambda_1$, it is necessary to combine a low-refraction antireflection layer having a refraction index $n_2$ and an optical thickness $n_2 d_2 = \lambda_1/4$ and a high refraction layer for adjusting the refractive index of the substrate, the high-refraction layer having a refractive index $n_1 = \sqrt{n_{sub} \cdot n_2}$ and an optical thickness of $n_1/d_l = \lambda_1/4$.

Usually, a ¼ wavelength layer of MgF$_2$ ($n_2 = 1.28$) and a ¼ wavelength layer of Al$_2$O$_3$ layer ($n_1 = 1.63$) are used as the antireflection layer and the layer for adjusting the refractive index of the substrate, respectively. A structure is obtained by forming, on a substrate of a refractive index $n_{sub} = 1.46$, the substrate refractive index adjusting layer and the antireflection layer each in thickness of $\lambda_1/4$ ($\lambda_1 = 250$ mm). This structure exhibits a reflectivity R which, as shown in FIG. 6, is 0% when the wavelength $\lambda_1$ is 250 mm. This structure, when the wavelength $\lambda_1$ is 750 mm to enable use of the antireflection band of $\lambda_0/3$, prevents refraction at two wavelengths, i.e., at 250 mm and 750 mm, as shown in FIG. 7.

It is assumed here that the alignment of an optical system, which employs a KrF excimer laser of oscillation wavelength 249 nm as the light source, is conducted through a visual check by making use of an HeNe laser of 633 oscillation wavelength as the light source. When an antireflection film of the construction shown in FIG. 6 is used, the reflectivity of 5% or more at 633 nm. This reflectivity is greater than the reflectivity of the substrate which is 4% when the refractive index $n_{sub}$ of the substrate is 1.5.

In order to overcome this problem, it has been proposed to utilize the antireflection center wavelength $\lambda_1$ and its higher order antireflection bands ($\lambda_1/3, \lambda_1/5,$ and so on).

As will be seen from FIG. 7, on condition of $\lambda_1 = 750$ nm, the reflectivity R is reduced to 0% at two wavelength regions: namely, a region around 250 nm corresponding to $\lambda_1/3$ and at 750 nm. At the oscillation wavelength of the He—Ne laser which is 633 nm, an appreciable antireflection effect, say R=2% or so, can be obtained. The antireflection band around 250 nm is very narrow and restricted. It is very difficult to set the antireflection center wavelength of an antireflection film to this restricted wavelength region, from the view point of tolerance in the production.

Both the Al$_2$O$_3$ and MgF$_2$ used as the materials of the antireflection layers exhibit tensile stresses. When such films are evaporated on a highly-polished surface, a strain of the polished surface is caused due to the tensile stresses generated in the films, so that the performance of an optical system is seriously degraded when the system includes an element having such films.

Under these circumstances, the present invention is aimed at providing a multi-layered antireflection film preventing reflection at two wavelength regions, which is capable of efficiently preventing reflection at any two wavelength regions and which does not cause any stress strain on a finely-finished polished surface on which the antireflection film is formed.

SUMMARY OF THE INVENTION

According to the present invention, there is provided a multi-layered antireflection film preventing reflection at two wavelength regions having, a substrate of a refractive index $n_{sub}$, the antireflection film comprising, a 5-layered structure formed on the substrate and composed of a first layer group including three layers of $n_1(\lambda_1/4) - n_2(\lambda_2/2) - n_3(\lambda_1/4)$ and a second layer group including two layers of $n_4(\lambda_1/4) - n_5(\lambda_1/4)$, the following conditions are met:

$$1 < n_1 \leq n_{sub}, \quad n_2 \geq n_{sub}$$

$$1 < n_3 \leq n_{sub} \text{ and } n_{sub}(n_5^2/n_4^2) \approx 1$$

and that the layers of the first layer group are made of materials selected from dielectric materials exhibiting compression stresses, while the layers of the second group layer are made of materials selected from dielectric materials exhibiting tensile stresses.

An Apfel circle diagram, which is detailed in [APPLIED OPTICS] (VOL. 11, No. 6, 1972), p1303–1312, is employed in the concept design of a multi-layered film for attaining a required performance. A strict design is executed by a digital computer which processes the rough or approximate solution obtained from this diagram.

Before turning to the description of embodiments, a brief description will be given of a computation of complex amplitude transmission factor of a multi-layered antireflection film conducted by the use of the above mentioned Apfel circle diagram.

When the complex amplitude transmission factor at an interface between air and a glass is graphically represented on a complex plane, the factor is shown as a vector which extends to a point $-0.2$ on the imaginary number axis starting from the point of origin of the coordinate. The end of this vector is determined by the Fresnel's equation shown below.

$$r = \frac{n_1 - n_2}{N_1 + N_2}$$

where, $n_1$ $(=1.0)$ represents the refractive index of air, while $n_2$ $(n_2 = 1.5)$ represents the refractive index of the glass.

The complex representation of this complex amplitude reflectivity is given as follows:

$$r = 0.2 e^{-i\pi}$$

This means that the vector is within the unit circle of the complex plane, with an amplitude of 0.2 and a phase of 180°.

When a thin film of a high refractive index is formed by evaporation at the interface between air and a glass, the vector representing the complex amplitude reflectivity draws a circle within the unit circle. This circle is referred to as "amplitude circle". The complex amplitude reflectivity is maximized when this amplitude circle crosses the axis of real number. This crossing point corresponds to the thin film having the optical thickness which is ¼ of the desired wavelength. When the optical thickness of the thin film is increased to ½ wavelength, the complex amplitude reflectivity vector returns to a start point of the circular movement which is the point indicative of the complex amplitude reflectivity at the interface between air and the glass.

The arcuate length of the path of movement along the amplitude circle is determined by the phase thickness of the thin film which is given as follows.

$$\Phi = 4\pi nd/\lambda$$

where, n and d represent, respectively, the refractive index of the thin film and the actual thickness of the thin film.

The center of the amplitude circle with respect to a thin film (refractive index n) placed in the air is located on the axis of imaginary number of the complex plane. The coordinate of the center is approximately given as follows.

$$r = \frac{1 - n}{1 + n}$$

If the initial value of the complex amplitude reflectivity, refractive index of the thin film and the phase film thickness of the thin film are given, it is possible to determine the final value of the complex reflectivity of this thin film by means of the circular diagram.

DETAILED DESCRIPTION OF THE PREFERRED EMBODIMENTS

THE FIRST EMBODIMENT

The invention can be carried out in the form of an antireflection film capable of preventing reflection at two different ultraviolet wavelength regions ($\lambda_1 = 249$ nm, $\lambda_2 = 633$ nm), having a structure defined by the following formula (1)

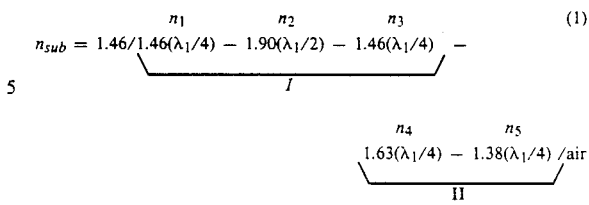

This structure is suitable for use in combination with an optical system having a KrF excimer laser of 249 nm oscillation wavelength as the light source, when the optical system is aligned through a visual check conducted by using an He-Ne laser of 633 nm oscillation wavelength as the light source.

Figure 1:
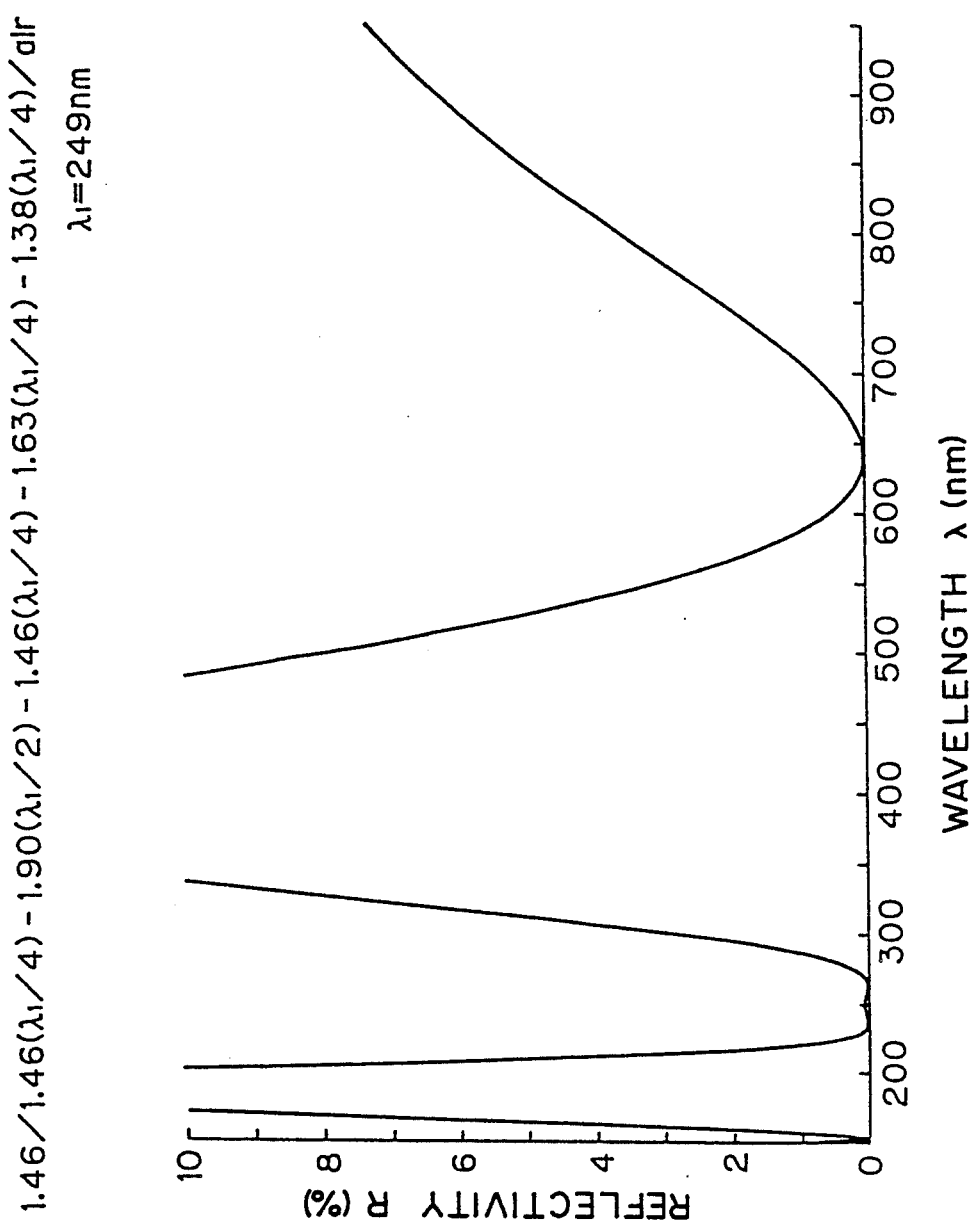
FIG. 1 is a diagram illustrative of the first embodiment of a multi-layered antireflection film of the invention capable of preventing reflection at two wavelength regions.

In this embodiment, a multi-layered antireflection film is obtained which exhibits sufficiently high antireflection effects at both center wavelengths of 249 nm and 633 nm and which is composed of films $SiO_2$ and $Y_2O_3$ exhibiting compression stresses and $Al_2O_3$ and $MgF_2$ which exhibit tensile stresses so as to prevent any strain from occurring in the highly polished surface by allowing the stresses to cancel each other. Thus, this embodiment has a structure expressed by $n_{sub}/SiO_2(\lambda_1/4) - Y_2O_3(\lambda_1/2) - SiO_2(\lambda_1/4) - Al_2O_3(\lambda_1/4) - MgF_2(\lambda_1/4)$ air. The spectral reflection characteristic of this multi-layered antireflection film is shown in FIG. 1.

Figure 6:
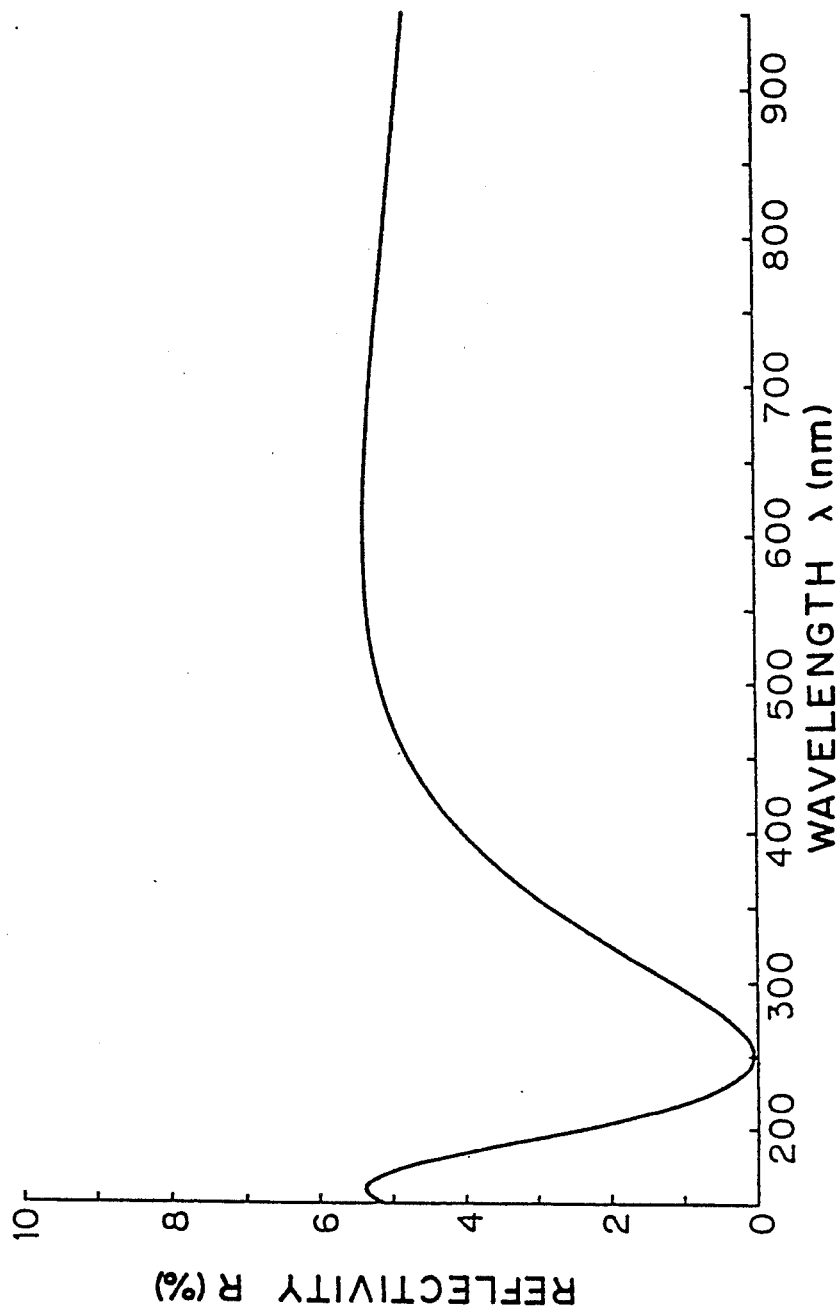
FIGS. 6 and 7 are charts illustrative of spectral reflectivity characteristics of a conventional multilayered antireflection film.
Figure 7:
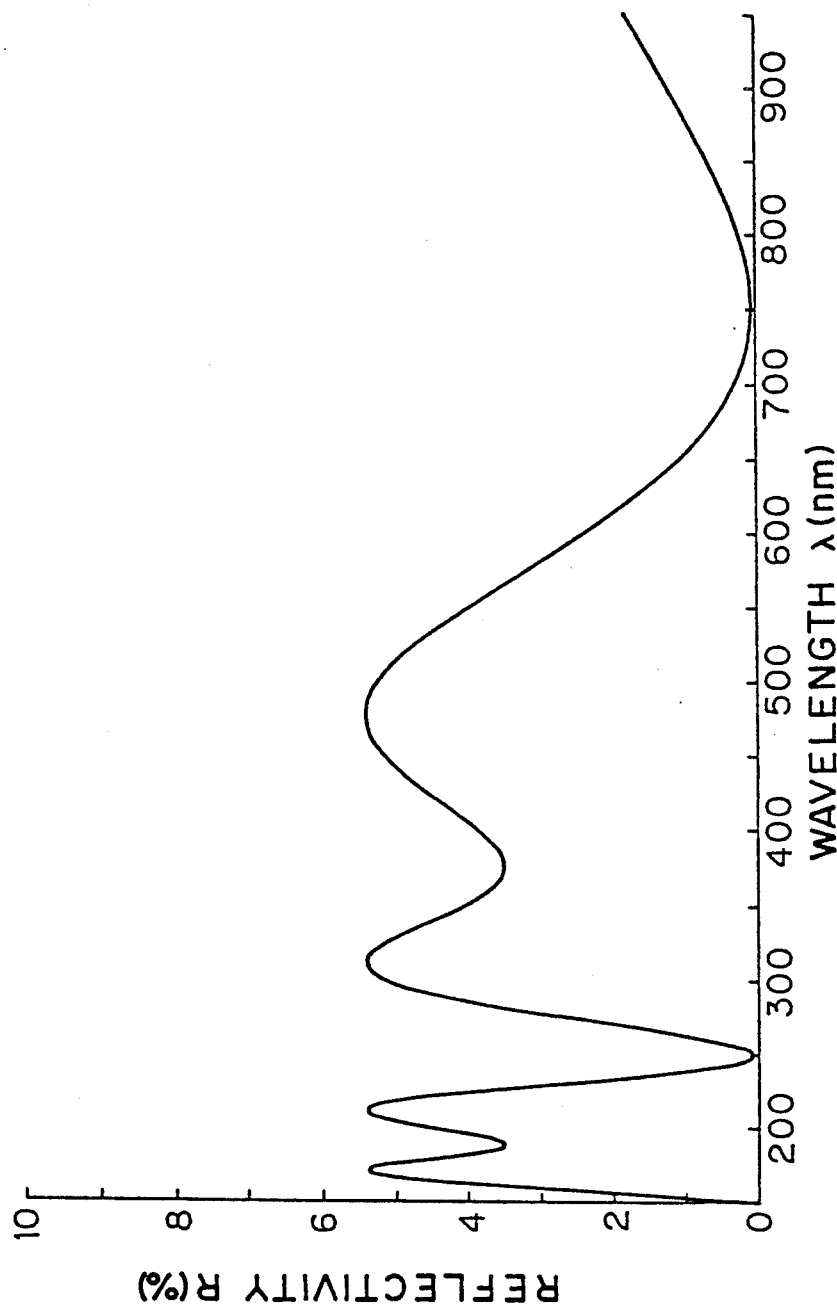

This structure exhibits the same level of reflectivity at 249 nm as that of V-coat (see FIG. 6) having an antireflection center wavelength of 249 nm. However, while the V coat exhibits a large reflectivity R of R > 5% at 633 nm, the structure of this embodiment exhibits a reflectivity which is as small as $R \leq 0.1\%$. The RMS value of this structure was measured by a Fizeau interferometer (Model Zygo produced by Zygo Company) to obtain a result of RMS $< \lambda/20$. In addition a difference $\Delta$RMS, which is the difference between the RMS values obtained before and after the polishing, is ensured to meet the condition of $\Delta$RMS $< \lambda/100$.

According to the film structure and the refractive indexes determined by the formula (1), it is possible to effectively prevent reflection at wavelengths $\lambda_1 = 249$ nm and $\lambda_2 = 633$ nm, for the reason which will be described hereinunder.

Since the conditions of $n_{sub} = 1.46$, $n_4 = 1.63$ and $n_5 = 1.38$ are met, the condition given by the following formula (2) is satisfied.

$$n_{sub}\left(\frac{n_5^2}{n_4^2}\right) = 1.46 \times \frac{1.38^2}{1.63^2} = 0.98 \approx 1.0 \quad (2)$$

The actual thickness of the layers having the refractive indices $n_4$ and $n_5$ are set to be $\lambda_1/4$, so that the second group II of layers satisfies the condition for prevention of reflection at the wavelength $\lambda_1$. Thus, the second group II of layers is a V coat which satisfies the condition for prevention of double-layer reflection at the first center wavelength $\lambda_1$.

Reflection is effectively prevented at two wavelength regions around $\lambda_1$ and $\lambda_1$, by arranging the $\lambda_2$ substrate refractive index adjusting layer $N_1$ and the $\lambda_2$ antireflection layer $N_2$ such that the reflection is effectively prevented at the second center wavelength $\lambda_2$ without impairing the above-described V-coat characteristic of the second layer group II at the first center wavelength $\lambda_1$. The $\lambda_2$ substrate refractive index adjusting layer $N_1$ is a layer which does not impair the reflection characteristic of the second group II at the wavelength $\lambda_1$ and which does not take part in the reflection characteristic of the second group II of layers at the wavelength $\lambda_1$. Thus, the layer Ni may be referred to as $\lambda_1$-irrelevant layer. The thickness of the $\lambda_1$-irrelevant layer $N_1$ is determined according to the value of the wavelength $\lambda_2$, namely, the thickness is small and large, respectively, when the wavelength $\lambda_2$ is small and large.

In general, it is known that the $\lambda_1$-irrelevant layer $N_1$ has a construction expressed by $n_A(\lambda_1/2)$ or $n_B(\lambda_1/4)\cdot n_C(\lambda_1/2)\cdot n_B(\lambda_1/4)$, with against film substances which have refractive index values $n_A$, $n_B$ and $n_C$. The described embodiment employs the second-mentioned structure, wherein the refractive index values are determined to meet the conditions of $n_B = n_1 = n_3 = 1.46$ and $n_C = n_2 = 1.90$.

The first group of layers is composed of a first layer having a refractive index $n_1$ of 1.46 and a thickness of $\lambda_1/4$, a second layer having a refractive index $n_2$ of 1.90 and a thickness of $\lambda_1/2$ and a third layer having a refractive index $n_3$ of 1.46 and a thickness of $\lambda_1/4$. The characteristic matrix M of this first group I of layers can be given as the product of the elementary matrixes $M_1$, $M_2$ and $M_3$ of the first, second and third layers.

Representing the phase thickness in the air by $\theta_i(i=1, 2, 3)$ and the actual layer thickness by $d_i(i=1, 2, 3)$, the phase thickness is determined by $\theta_i = (4\pi/\lambda_{is})d_i$. Then, the elementary matrix $M_i$ $(i=1, 2, 3)$ of each layer is given by the following formula (3).

$$M_i = \begin{pmatrix} \cos\theta_i & (i/n)\sin\theta_i \\ in_i\sin\theta_i & \cos\theta_i \end{pmatrix} \quad (3)$$

Since the conditions of $d_1 = d_3 = (\frac{1}{4})\lambda_l$ and $d_2 = (\frac{1}{2})\lambda_1$ are met, the following conditions are satisfied:

$$M_1 = M_3 = \begin{pmatrix} -1 & 0 \\ 0 & -1 \end{pmatrix}, M_2 = \begin{pmatrix} 1 & 0 \\ 0 & 1 \end{pmatrix}$$

In consequence, the characteristic matrix M of the first group I of the layers is given by the following formula (3)'.

$$M = M_1 \cdot M_2 \cdot M_3 = \begin{pmatrix} -1 & 0 \\ 0 & -1 \end{pmatrix}\begin{pmatrix} 1 & 0 \\ 0 & 1 \end{pmatrix}\begin{pmatrix} -1 & 0 \\ 0 & -1 \end{pmatrix} = \begin{pmatrix} 1 & 0 \\ 0 & 1 \end{pmatrix} \quad (3)'$$

From this formula, it will be seen that the first group I of layers does not produce any effect on the antireflection characteristic of the second group II of layers at the wavelength $\lambda_1$.

In order that the first group I of layers meets the condition for preventing reflection at the second center wavelength $\lambda_2 (=633$ nm), it is necessary that the earlier half portion of the group I serves as a $\lambda_2$-substrate refractive index adjusting layer while the later half part serves as a $\lambda_2$-antireflection layer. Namely, from the condition of V-coat for the first group I of thin layer, i.e., from the condition of two-layer antireflection, it is necessary that the condition of the following formula (4) is met, representing the equivalent refractive index and the actual thickness of the layers of the earlier half part by $N_1$ and $D_1$, respectively, while representing those of the later half part by $N_2$ and $D_2$.

$$N_1D_1 \approx \lambda_2/4$$

$$N_2D_2 \approx \lambda_2/4 \quad (4)$$

$$N_1 \approx \sqrt{n_{sub} \cdot N_2} \quad (4)$$

In this case, the wavelength $\lambda_2$ and the refractive index $n_{sub}$ have been given as $\lambda_2 = 633$ nm and $n_{sub} = 1.46$. Therefore, a very rough approximation is possible between the thin film system formed by providing the first group I of layers on the substrate ($n_{sub} = 1.46$), i.e., a film system represented by $$n_{sub} = 1.46/1.46(\lambda_1/4) \overset{n_1}{-} 1.90(\lambda_1/2) \overset{n_2}{-} 1.46(\lambda_1/4) \overset{n_3}{-}$$

$$\overset{n_4}{1.63(\lambda_1/4)} \overset{n_5}{- 1.38(\lambda_1/4),}$$

and a thin film system expressed by the following formula (5) formed by providing the $\lambda_2$-substrate refractive index adjusting layer $N_1$ and the $\lambda_2$-antireflection layer $N_2$ on the substrate ($n_{sub} = 1.46$).

$$n_{sub} = 1.50/N_1(\lambda_2/4) - N_2((\lambda_2/4) \quad (5)$$

For the purpose of simplification of explanation, the half portion (expressed by $(\lambda_1/4) \times 3$) of the total optical film thickness (expressed by $(\lambda_1/4) \times 6$), i.e., the structure $1.46(\lambda_1/4) - 1.90(\lambda_1/2)$ is considered as being $N_1(\lambda_2/4)$, while the remainder half part (expressed by $1.46(\lambda_1/4) - 1.63(\lambda_1/4) \cdot 1.38(\lambda_1/4)$ is considered to be $N_2(\lambda_1/4)$.

From this assumption, the condition expressed by the following formula (6) is obtained.

$$N_1D_1 = N_2D_2 = (\lambda_1/4) \times 3 \quad (6)$$
$$= 750/4 \approx 633/4 = (\lambda_2/4)$$

The thickness $D_1$ and $D_2$ are given as follows:

$$D_1 = \frac{\lambda_1}{4n_1} + \frac{\lambda_1}{2n_2}$$

$$D_2 = \frac{\lambda_1}{4n_3} + \frac{\lambda_1}{4n_4} + \frac{\lambda_1}{4n_5}$$

Therefore, $N_1$ and $N_2$ calculated as expressed by the following formulae (7) and (8).

$$N_1 = \frac{\lambda_2}{4D_1} = \frac{\lambda_2}{\frac{\lambda_1}{n_1} + \frac{2\lambda_1}{n_2}} = \frac{\lambda_2 \cdot n_1 \cdot n_2}{\lambda_1(2n_1 + n_2)} \quad (7)$$

$$N_2 = \frac{\lambda_2}{4D_2} = \frac{\lambda_2}{\lambda_1\left(\frac{1}{n_3} + \frac{1}{n_4} + \frac{1}{n_5}\right)} \quad (8)$$

Thus, $N_1$ and $N_2$ are calculated as $N_1 \approx 1.727$ and $N_2 = 1.483$.

Figure 2:
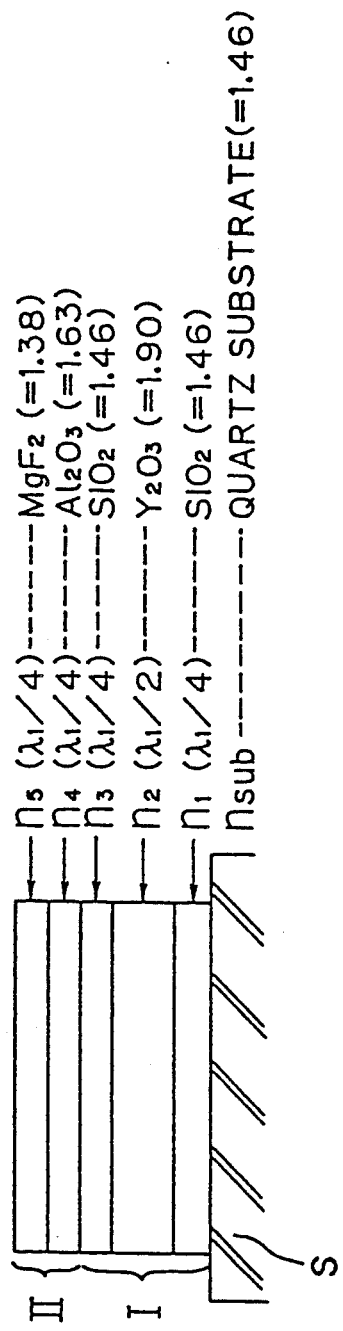
FIG. 2 is an illustration of the construction of the film.
Figure 3:
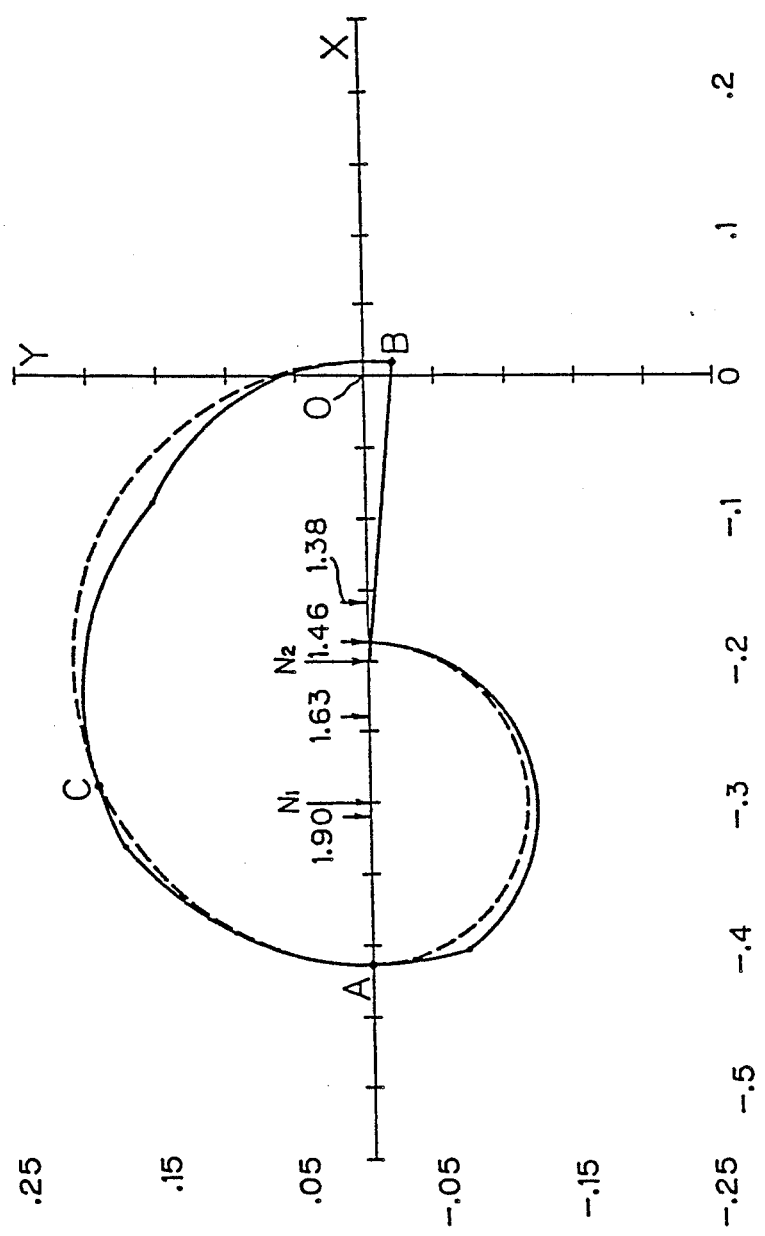
FIG. 3 is an illustration of the complex amplitude reflectivity shown by Apfel circle diagram.

The complex amplitude reflectivity of this equivalent two-layered film system is expressed by an Apfel circle diagram in FIG. 3. Referring to FIG. 3, the complex amplitude reflectivity S of the substrate S shown in FIG. 2 is determined. Since the refractive index $n_{sub}$ of the substrate is given as $n_{sub}=1,46$, the reflectivity S is determined by $S=(1-1.46)/(1+1.46)=-0.19$, the end of the vector S is located at a point on the axis of the imaginary part of the complex plane, i.e., at a coordinate point expressed by $(-0.19i)$. This point corresponds to the point 1.46 marked on the X-axis. Thus, the complex amplitude reflectivity vector S of the substrate S is expressed by $S_1 = 0.19e^{-i\pi}$.

Then, the center $r_1$ of the amplitude circle with respect to the irrelevant layer $N_1$ is determined.

Using the condition of $N_1 = 1.727$, a condition is obtained as follows:

$$r_1 = \frac{1-N_1}{1+N_1} = \frac{1-1.727}{1+1.727} = -0.26 \approx -0.3$$

Namely, the center of the amplitude circle with respect to the irrelevant layer $N_1$ is on the axis X of imaginary part, at a point $-0.3i$. The point having this coordinate value is illustrated as $N_1$.

The end of the complex amplitude reflectivity vector S is rotated clockwise about the center $(-0.3i)$ of the amplitude circle of the irrelevant layer $N_1$ through an angle of 180° which corresponds to the phase film thickness $\Phi_1 = 4\pi N_1 D_1/\lambda_2$ (from formula (4), $N_1 D_1 = \lambda_2/4$ is obtained), so that the end of the vector is moved to the point A on the X-axis. The complex amplitude reflectivity index S=OA obtained in this state represents the surface reflectivity from a single-layer film $N_1$ evaporated on the substrate S, obtained when an irrelevant layer of a refractive index $N_1$ and the film thickness (actual thickness) $D_1$ is deposited on the substrate S.

When a composite film is formed by evaporating an antireflection layer $N_2$ having a refractive index $N_2$ and a film thickness (actual thickness) $D_2$ is evaporated on an irrelevant layer $N_1$, the surface reflectivity from this composite film is determining as follows by through a drafting in accordance with the theory of Apfel circle diagram.

As the first step, the center $r_2$ of the amplitude circle with respect to the antireflection layer $N_2$ is determined as follows, by utilizing the condition of $N_2 = 1.483$.

$$r_2 = \frac{1-N_2}{1+N_2} = \frac{1-1.483}{1+1.483} = -0.19 \approx -0.2$$

Thus, the center of the amplitude circle with respect to the antireflection layer $N_2$ is on the axis X of the imaginary part and the coordinate value is $-0.2i$. This coordinate point is shown in the drawings as $N_2$.

The end of the complex amplitude reflectivity vector S, which represents the surface reflectivity of the irrelevant layer $N_1$ evaporated on the substrate S, is rotated clockwise about the center $(-0.2i)$ of the amplitude circle of the irrelevant layer $N_2$ through an angle of 180° which corresponds to the phase film thickness $\Phi_2 = 4\pi N_2 D_2/\lambda_2$ (from formula (4), $N_2 D_2 = \lambda_2/4$ is obtained), so that the end of the vector S returns to the starting point, i.e., to the point of origin of the coordinate. In the state shown in FIG. 3, the end of the vector S has not returned to the point O of origin but has reached a point B. This is because the drafting conducted in accordance with the Apfel circle diagram was rather rough so that the degree of approximation was not so high. If the drafting is conducted by composing complex amplitude reflectivity vectors progressively by a digital computer while taking into account the phase terms of the vectors a drawing will be obtained as illustrated. The foregoing description is intended for facilitating the principle of the invention.

The origin point is the point where the complex amplitude reflectivity is "0". It is therefore understood that the aforementioned two-layered film composed of the layers $N_1$ and $N_2$ satisfies the condition for prevention of reflection at the wavelength of $\lambda_2 = 633$ nm.

In FIG. 3, the complex amplitude reflectivity of the antireflection multi-layered film system drawn in accordance with the theory of Apfel circle diagram is shown by a solid line.

As discussed before in connection with the equivalent 2-layered film system, the complex amplitude reflective index vector S of the substrate S is expressed as $S = 0.19e^{-i\pi}$, and the end of this vector S is located at the point on the X-axis marked at 1.46.

Even though the first layer having the refractive index $n_1$ of 1.46 is formed on the substrate S, the vector S remains unchanged so that the end of the vector remains on the point 1.46 of the X-axis.

Subsequently, the center $r_2$ of the amplitude circle with respect to the second layer having the refractive index $n_2$ of 1.90 is determined as follows, using the condition of $n_2 = 1.90$.

$$r_2 = \frac{1-n_2}{1+n_2} = \frac{1-1.90}{1+1.90} = -0.310 \approx -0.3$$

Thus, the center of the amplitude circle with respect to the second layer having the refractive index $n_2$ is on the X-axis at a coordinate point $-0.3i$. The point corresponding to this coordinate value is indicated at $N_1$ in the drawings. The end of the complex amplitude reflective index vector S of the substrate S is rotated clockwise about the center $(-0.3i)$ of the amplitude circle of the second layer though an angle corresponding to the phase film thickness of the second layer expressed by $\Phi_2 = 4\pi n_2 d_2/\lambda_2$ ($d_2 = \lambda_1/2$, $\lambda_1 = 249$ nm, $\lambda_2 = 633$ nm) to reach a point indicated by C in FIG. 3. The angle $\Phi_2$ of rotation is calculated as follows:

$$\Phi_2 = 4\pi n_2(\lambda_1/2)\cdot 1/\lambda_2 = 2\pi n_2(\lambda_1/\lambda_2) = 2\pi \times 0.76 \approx 1.52\pi = 277°.$$

The complex amplitude reflectivity of a composite film as obtained when the third layer of $n_3 = 1.46$ is added, is determined as follows by making use of the Apfel circle diagram.

As the first step, the center $r_3$ of the amplitude circle with respect to the third surface having the refractive index $n_3$ of 1.46 is determined as follows, using the condition of $n_3 = 1.46$.

$$r_3 = \frac{1-n_3}{1+n_3} = \frac{1-1.46}{1+1.46} = -0.19 \approx -0.20$$

That is, the center of the amplitude circle with respect to the this layer of $n_3 = 1.46$ is located on the axis X of the imaginary part and its coordinate value is expressed by $-0.2i$. This coordinate point is shown as $N_2$ in the drawing.

Then, the complex amplitude refractive index vector S, the end of which is coinciding with C, is rotated clockwise about the center (−0.2i) of the amplitude circle of the third layer though an angle corresponding to the phase film thickness $\Phi_3$ of the second layer expressed by $\Phi_3 = 4\pi n_2 d_2/\lambda_2$ ($d_3 = \lambda_1/4$, $\lambda_1 = 249$ nm, $\lambda_2 = 633$ nm). The angle $\Phi_2$ of rotation is calculated as follows:

$$\Phi_3 = 4\pi n_3(\lambda_1/4)\cdot 1/\lambda_2 = \pi n_3(\lambda_1/\lambda_2) = \pi \times 1.46 \times (249/633) = \pi \times 1.46 \times 0.4 = 0.58\pi \approx 104°$$

In consequence, the vector S reaches a position which is indicated at B on the drawing. According to the drafting described above, the total rotation angle $\Phi$ of the vector S is calculated as $\Phi = \Phi_1 + \Phi_2 = 277° + 104° = 381°$. This angle is slightly greater than the angle formed between the X-axis and the semi-straight line N$_2$B read from FIG. 3. As explained before in connection with the equivalent two-layered film, however, the end B of the vector will reach the correct position if the drafting is done by progressively composing the complex amplitude reflection vectors by mean of a digital computer taking into account the phase term of the complex amplitude reflectivity vectors.

Anyway, the terminal point is in the close proximity of the original point O, so that the first group I of the layers satisfies the condition for preventing reflection at the second center wavelength $\lambda_2$.

A description will be given of the condition for preventing reflection at two wavelengths by a multi-layered film.

According to formula (1) which represents the multi-layered antireflection film of this embodiment, the refractive indexes are given as $n_1 = 1.46$, $n_2 = 1.90$ and $n_3 = 1.46$, and the refractive index of the substrate is given as $n_{sub} = 1.46$.

In consequence, the following conditions are met:

$$1 < (n_1 = 1.46) = (n_{sub} = 1.46)$$

$$(n_2 = 1.90) > (n_{sub} = 1.46)$$

$$1 < (n_3 = 1.46) = (n_{sub} = 1.46)$$

Thus, the following condition (9) is satisfied.

$$1 < n_1 \leq n_{sub}$$

$$n_2 \geq n_{sub} \quad (9)$$

$$1 > n_3 \leq n_{sub}$$

By regarding $n_2$ as being $N_1$ in FIG. 3 showing the Apfel diagram, it is readily understood that the condition of $n_2 \leq n_{sub}$ is necessary and sufficient for enabling the first group I of layers to prevent reflection at the second center wavelength region $\lambda_2$ in the structure of this embodiment defined by the formula (1). It is possible to confirm that the condition of the formula (9) is met also in the cases of $n_1$ and $n_3$, by drawings circles in accordance with the Apfel circle diagrams on practical conditions.

It has been made clear that, in the film structure as defined by the formula (1), the antireflection characteristic of the second group II of layers at the first center wavelength $\lambda_1$ is not affected by the group I of the layers. Thus, conditions which are necessary and sufficient for enabling the first group I to prevent reflection at the second center wavelength $\lambda_2$($\lambda_2 > \lambda_1$) without causing influence on the antireflection characteristic of the group II of layers at the first center wavelength are the restriction of the film structure made in formula (1) and the restriction posed on refractive indexes made in formula (9).

The condition for prevention of the second group II of layers at the first center wavelength $\lambda_1$, i.e., the condition for the V-coat, is given by $n_{sub}(\lambda_5^2/\lambda_4^2) \approx 1$ as described before.

Thus, the multi-layered film composed of the first group I and the second group II can prevent reflection at two wavelengths $\lambda_2$ ($\lambda_2 > \lambda_1$), when all of the three conditions: namely, the film structure determined by the formula (1), the restrictions on the refractive indexes in formula (9) and the condition of $n_{sub}(\lambda_5^2/\lambda_4^2) \approx 1$ are simultaneously satisfied.

(The Second Embodiment)

The film of the second embodiment has a film structure represented as follows:

$n_{sub}$
1.46/1.90($\lambda_1/2$) − 1.46($\lambda_1/4$) − 1.63($\lambda_1/4$) − 1.38($\lambda_1/4$)/air, $\lambda_1 = 249$ nm.

Figure 4:
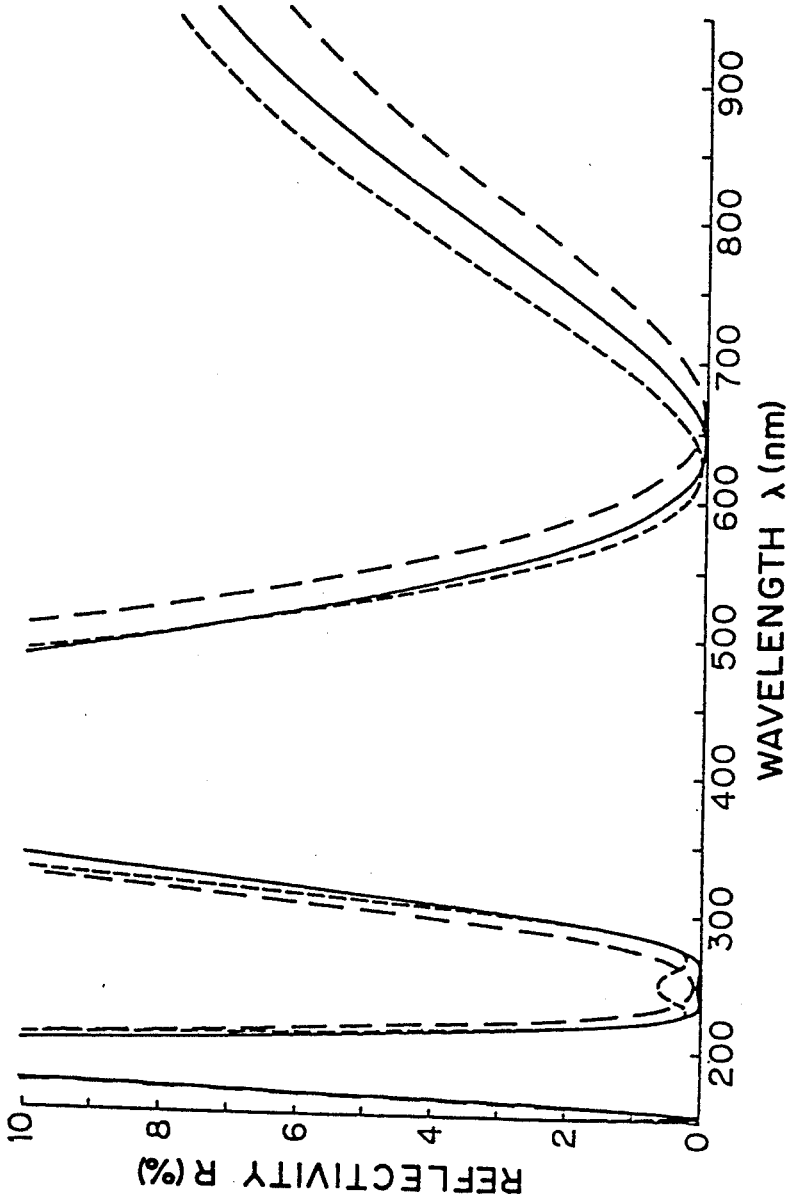
FIGS. 4 and 5 are charts illustrative of spectral reflectivities of the second embodiments.

The spectral reflection characteristic of this antireflection film is shown by a solid line in FIG. 4. The first layer may be omitted if this layer meets the condition of $n_1 \approx 1$.

THE THIRD EMBODIMENT

The film of the third embodiment has structures expressed as follows:

$n_{sub}$
1.46/1.38($\lambda_1/4$) − 1.90($\lambda_1/2$) − 1.46($\lambda_1/4$) − 1.63($\lambda_1/4$) −

1.38($\lambda_1/4$)/air, $\lambda_1 = 249$ nm $n_{sub}$
1.46/1.46($\lambda_1/4$) − 1.90($\lambda_1/2$) − 1.38($\lambda_1/4$) − 1.63($\lambda_1/4$) −

1.38($\lambda_1/4$)/air.

$\lambda_1 = 249$ nm

The antireflection films having the above-described two types of structure exhibit, respectively, spectral reflection characteristics as shown by a broken line and solid line in FIGS. 4. A structure of $n_1 \neq n_3$ also is available although such a structure exhibits a slightly increased reflectivity.

THE FOURTH EMBODIMENT

The fourth embodiment has the structure expressed as follows.

| $n_{sub}$ | MoF$_2$ | V$_2$O$_3$ | MgF$_2$ | AlO$_2$ |
|---|---|---|---|---|
| 1.46/1.38($\lambda_1/4$) − | 1.90($\lambda_1/2$) − | 1.38($\lambda_1/4$) − | 1.63($\lambda_1/4$) − | |

SiO$_2$
1.46($\lambda_1/4$)/air

Figure 5:
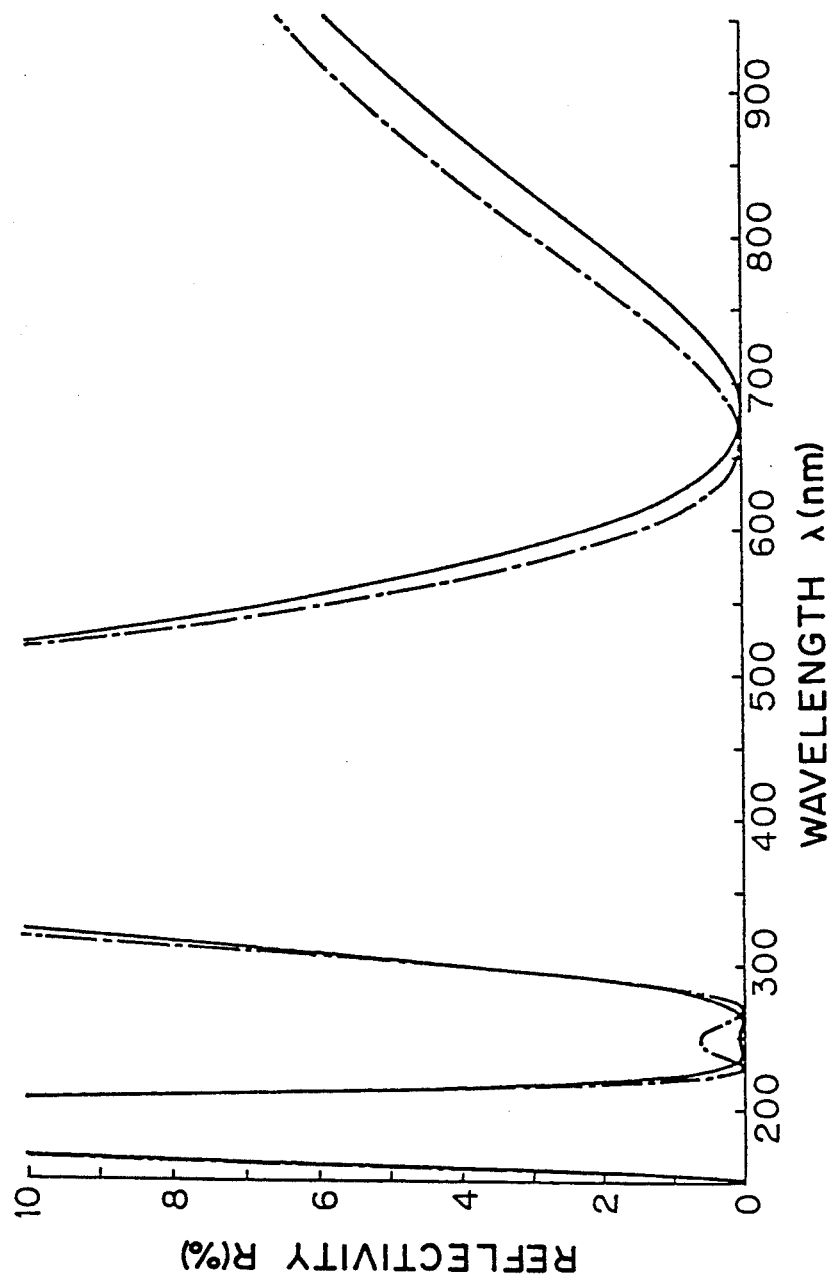

The spectral reflection characteristic of the antireflection film of thus structure is shown by one-dot-and-dash line in FIG. 5.

It is impossible to provide a definite distinction of the directions of the stress, i.e., positive and negative directions (positive direction corresponds, for example, to compression) between the first group of layers and the second groups of layers, as is the case of the construction shown in FIG. 5. It is, however, possible to obtain a structure in which films exhibiting compression stress and tensile stress appear substantially alternatingly.

Alternatively, a construction as shown below can be used.

$n_{sub}$
$1.46/1.46(\lambda_1/4) - 1.90(\lambda_1/2) - 1.38(\lambda_1/4) - 1.63(\lambda_1/4) -$ $1.46(\lambda_1/4)/\text{air}$ The spectral reflection characteristic exhibited by this structure is shown by solid line in FIG. 5.

When the wavelengths $\lambda_1$ and $\lambda_2$ are given as $\lambda_1 = 249$ nm and $\lambda_2 = 633$ nm, a sufficient antireflection effect is produced at the wavelength of 249 nm when the condition of $n_{sub}(n_5^2/n_4^2) \simeq 1$ and $n_1 = n_2$ are met. In some cases, such a film material may not be available or, even if such a material is available, such a material may be unsuitable for use because the direction of the stress in the film made of such a material may be opposite to the expected direction of stress. In such a case, a condition of $n_{sub}(n_5^2/n_4^2) \neq 1$ is obtained so that a correction can be done by introducing the condition of $n_1 \neq n_2$, although such a measure causes the reflectivity at 249 nm to increase slightly.

It is not always essential that the layers of the first group and the layers of the second group exhibit distinctive difference in regard to the direction of the stress. Namely, the arrangement may be such that layers exhibiting compression and tension stresses alternatingly appear whole through the structure which is composed of the first group and the second groups of the layers.

The described features of the present invention offers high efficiency of prevention of reflection at two wavelengths: namely, the operating wavelength and the alignment wavelength. In addition, the laminate or multi-layered structures of the antireflection film is realized by laminating layers which exhibit compression and tensile stresses so that the compression and tensile stresses cancel each other to prevent any stress strain from being generated in the highly finished and polished surface on which the multi-layered structure is carried. It is therefore possible to prevent occurrence of ghost and flare without causing deterioration of the performance of optical system including the above-mentioned polished surface.

I claim:

1. A multi-layered antireflection film preventing reflection at two wavelength regions, having a substrate of a refractive index $n_{sub}$, said antireflection film comprising, a 5-layered structure formed on said substrate and composed of a first layer group including three layers of $n_1(\lambda_1/4)$-$n_2(\lambda_2/2)$-$n_3(\lambda_1/4)$ and a second layer group including two layers of $n_4(\lambda_1/4)$-$n_5(\lambda_1/4)$, characterized in that the following conditions are met:

$1 < n_1 \leq n_{sub}, n_2 \geq n_{sub}$ $1 < n_3 \leq n_{sub}, \text{ and } n_{sub}(n_5^2/n_4^2) \leq 1$ and that said layers of said first layer group are made of materials selected from dielectric materials exhibiting compression stresses, while said layers of said second group layer are made of materials selected from dielectric materials exhibiting tensile stresses.

2. A multi-layered antireflection film preventing reflection at two wavelength regions according to claim 1, wherein said dielectric materials exhibiting compression stresses include $SiO_2$, $Y_2O_3$ and $ZnS$.

3. A multi-layered antireflection film preventing reflection at two wavelength regions according to claim 1, wherein said dielectric materials exhibiting tensile stresses include $Na_3AlF_6$, $MgF_2$, $CaF_2$, $NaF$, $LiF$, $YF_3$, $LaF_3$, $ThF_4$, $Al_2O_3$, $ScO_2$, $HfO_2$ and $ZrO_2$.

* * * * *